(12) United States Patent
Hoehmann et al.

(10) Patent No.: US 9,506,660 B2
(45) Date of Patent: Nov. 29, 2016

(54) ARRANGEMENT FOR AIR CONDITIONING ROOMS AND HEAT PUMP UNIT FOR USE IN THE ARRANGEMENT

(75) Inventors: Lars Hoehmann, Maennedorf (CH); Adrian Peterhans, Niederrohrdorf (CH)

(73) Assignee: Mentus Holding AG, Cham (CH)

( * ) Notice: Subject to any disclaimer, the term of this patent is extended or adjusted under 35 U.S.C. 154(b) by 856 days.

(21) Appl. No.: 13/505,278

(22) PCT Filed: Oct. 6, 2010

(86) PCT No.: PCT/CH2010/000244
§ 371 (c)(1),
(2), (4) Date: Apr. 30, 2012

(87) PCT Pub. No.: WO2011/050485
PCT Pub. Date: May 5, 2011

(65) Prior Publication Data
US 2012/0210732 A1    Aug. 23, 2012

(30) Foreign Application Priority Data

Oct. 30, 2009  (CH) ..................................... 1671/09

(51) Int. Cl.
| | | |
|---|---|---|
| *F25B 21/00* | (2006.01) | |
| *F25B 21/02* | (2006.01) | |
| *F25B 21/04* | (2006.01) | |

(Continued)

(52) U.S. Cl.
CPC ................. *F24D 3/18* (2013.01); *F24D 12/02* (2013.01); *F24F 3/001* (2013.01); *F24F 3/06* (2013.01); *F24F 5/0042* (2013.01); *F25B 21/04* (2013.01); *Y02B 30/14* (2013.01)

(58) Field of Classification Search
CPC .......... F25B 21/00; F25B 21/02; F25B 21/04
See application file for complete search history.

(56) References Cited

U.S. PATENT DOCUMENTS

2,796,743 A    6/1957  McFarlan
3,067,592 A   12/1962  McFarlan (Continued)

FOREIGN PATENT DOCUMENTS

CN    1587825 A   3/2005
DE    6949660 U1  4/1973

(Continued)

OTHER PUBLICATIONS

Translation of the International Preliminary Report on Patentability for International Application No. PCT/CH2010/000244, mailed Jun. 14, 2012.

*Primary Examiner* — Frantz Jules
*Assistant Examiner* — Erik Mendoza-Wilkenfe
(74) *Attorney, Agent, or Firm* — Nixon Peabody LLP

(57) ABSTRACT

The invention relates to an arrangement for air-conditioning rooms and to a heat pump for use in such an arrangement. The arrangement comprises a central heating device, to which multiple lines containing a heat-exchanging fluid are connected. The arrangement additionally comprises multiple decentralized, electrically operated heat pump units, which are energetically connected to the central heating device via the mentioned lines. The respective heat pump unit has a plurality of heat pump modules, which absorb thermal energy from the fluid for heating or deliver thermal energy to the fluid for cooling and/or dehumidifying. The mentioned heat pump modules preferably comprise Peltier elements acting as heat pump elements.

10 Claims, 3 Drawing Sheets

Figure 1:
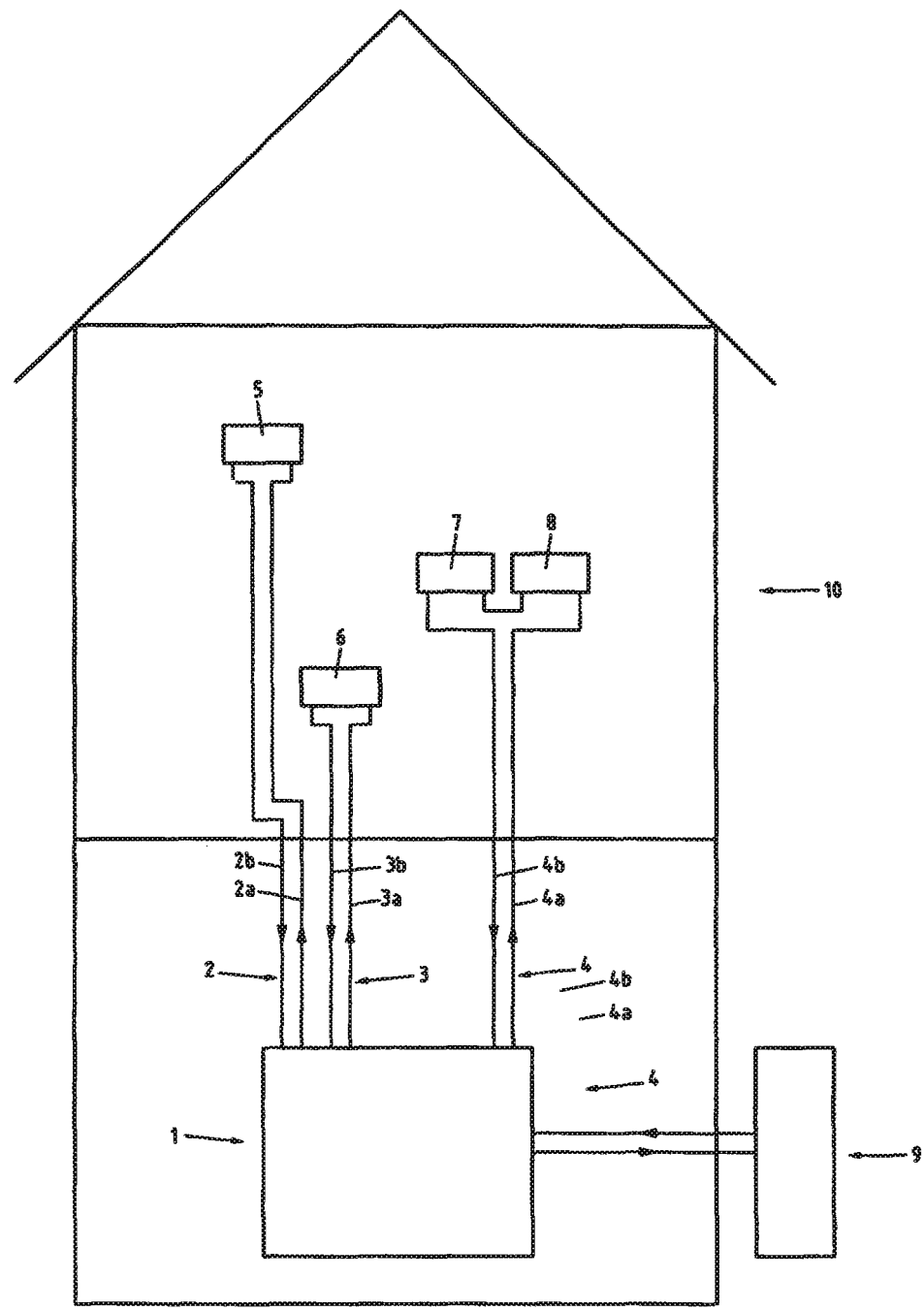

(51) Int. Cl.
*F24D 3/18* (2006.01)
*F24D 12/02* (2006.01)
*F24F 3/00* (2006.01)
*F24F 3/06* (2006.01)
*F24F 5/00* (2006.01)

(56) References Cited

U.S. PATENT DOCUMENTS

| | | | |
|---|---|---|---|
| 3,073,126 A | | 1/1963 | Staebler |
| 3,252,504 A | | 5/1966 | Newton |
| 3,631,686 A | * | 1/1972 | Kautz ............................ 62/173 |
| 4,492,086 A | * | 1/1985 | Bollinger ............... F24D 5/005 62/3.3 |
| 5,375,421 A | | 12/1994 | Hsieh |
| 6,393,842 B2 | | 5/2002 | Kim et al. |
| 2001/0005990 A1 | | 7/2001 | Kim et al. |
| 2003/0145605 A1 | * | 8/2003 | Moon ................... F24F 5/0042 62/3.2 |
| 2007/0214799 A1 | | 9/2007 | Goenka |
| 2008/0028768 A1 | | 2/2008 | Goenka |
| 2009/0000310 A1 | * | 1/2009 | Bell et al. .................... 62/3.7 |

FOREIGN PATENT DOCUMENTS

| | | |
|---|---|---|
| DE | 41 01 644 | 7/1992 |
| DE | 295 12 639 U1 | 10/1995 |
| DE | 201 05 487 U1 | 10/2001 |
| DE | 103 27 953 A1 | 1/2004 |
| DE | 10 2004 045 360 | 4/2006 |
| DE | 10 2007 049 621 | 4/2009 |
| EP | 0 432 264 | 6/1991 |
| EP | 0 650 110 | 4/1995 |
| FR | 2 460 449 | 1/1981 |
| GB | 970 327 | 9/1964 |
| GB | 970327 A * | 10/1964 |
| GB | 1 218 727 | 1/1971 |
| JP | 64-63730 A | 3/1989 |
| JP | 7-116449 A | 5/1995 |
| JP | 07116449 A * | 5/1995 |
| JP | 7-190400 A | 7/1995 |
| JP | 2004-12003 A | 1/2004 |
| JP | 2005-156093 A | 6/2005 |
| JP | 2008-190804 A | 8/2008 |
| JP | 2008190804 A * | 8/2008 |
| WO | 89/00268 A1 | 1/1989 |
| WO | 94/12833 | 6/1994 |
| WO | WO9412833 * | 9/1994 |
| WO | 2007/058576 A1 | 5/2007 |

* cited by examiner

ARRANGEMENT FOR AIR CONDITIONING ROOMS AND HEAT PUMP UNIT FOR USE IN THE ARRANGEMENT

PRIORITY CLAIM

Applicant hereby claims foreign priority under 35 U.S.C §119 from PCT application number PCT/CH2010/000244 entitled "Arrangement for air conditioning rooms and heat pump unit for use in the arrangement", filed Oct. 6, 2010, the disclosure of which is herein incorporated by reference, which in turn claims priority of the Swiss patent application number 1671/09 filed Oct. 30, 2009.

TECHNICAL FIELD

The present invention relates to an arrangement for air-conditioning rooms and to a heat pump unit for use in such an arrangement.

Greatly varying heating devices are used for heating rooms, for example oil heaters, gas heaters, wood heaters, pellet heaters, heat pumps, or electrical heaters. However, heating devices which can both heat and also cool, for example combined air-conditioning/heating devices or reversible heat pumps, in which the refrigerating circuit can be reversed, are also known.

The listed heating devices typically dissipate their heat via an underfloor heater, via radiators, or a combination of both to the room air. Radiators have typically heretofore been used if the heating device delivers comparatively high flow temperatures in the range of approximately 50-90° C. Such high flow temperatures are predominantly generated by means of oil heaters, gas heaters, wood heaters, or pellet heaters. In contrast, underfloor heaters are predominantly used if the heating device delivers comparatively low flow temperatures in the range of approximately 30-50° C. For example, heat pumps can be listed as an example thereof. In contrast, if flow temperatures of greater than 50° C. are to be generated using a heat pump, the heating becomes inefficient, since the efficiency of conventional heat pumps decreases with increasing flow temperature or temperature differential between the medium of the heat reservoir, for example outside air, soil, groundwater, etc., and the flow temperature to be generated.

While the room temperature can be changed rapidly in the case of heating systems having radiators, a disadvantage of underfloor heaters is that they are sluggish because of the large mass to be heated. A further disadvantage of underfloor heaters is that they are unsuitable if a room is to be cooled via the heating pipes, since no noticeable natural convection can be generated in the room to be cooled in the case of cooling via the heating or cooling pipes embedded in the floor, so that without forced air circulation, in particular only the floor becomes cold, especially because cold air is known to have a higher density than warm air. In addition, condensation occurs at low temperatures.

Instead of the listed heating devices, for example, air conditioning split devices can also be used. However, air conditioning split devices are subject to the disadvantage that a refrigerant circulates between the outside unit—condenser-compressor part—and the inside unit—vaporizer—, which can be hazardous to health. If the inside unit is arranged far away from the outside unit, the lines accommodating the refrigerant must be guided at least partially through residential or office rooms, which is undesirable and can be connected with a health risk. In addition, the efficiency decreases linearly with increasing length of the cooling lines.

BRIEF DESCRIPTION OF THE INVENTION

The object of the present invention is to provide an arrangement for air-conditioning rooms comprising at least one central heating device and at least one decentralized heat pump unit, which is/are energetically connected to the central heating device, in which a pleasant room climate may be achieved even with comparatively low flow temperatures of the central heating device, without a large heat exchanger surface, for example, in the form of large-area radiator bodies or a flat underfloor heater, having to be provided, the system having a good efficiency, and the temperature in the individual rooms being individually settable.

In that the arrangement comprises, in addition to the central heating device, at least one decentralized heat pump unit, which is energetically connected to the central heating device via the listed lines, the fundamental condition is provided so that the room air can be raised or lowered to the desired temperature in a decentralized manner, preferably directly in the respective room to be air-conditioned. The decentralized heat pump unit does not need to provide all of the power, but rather only the difference between the flow temperature delivered by the central heating device and the temperature required to achieve the desired room climate.

A further positive effect of decentralized, electrically operated heat pump units is that the temperature and optionally also the humidity in the individual rooms is individually settable.

It is thus proposed in a particularly preferred refinement that the respective heat pump unit has a plurality of Peltier elements, of which at least single ones can be individually electrically activated and/or reversed in polarity. The fundamental condition is therefore provided so that the respective heat pump unit can be operated both in the heating mode and also in the cooling mode and the room air can optionally be dehumidified

BRIEF DESCRIPTION OF THE DRAWING FIGURES

The accompanying drawings, which are incorporated into and constitute a part of this specification, illustrate one or more embodiments of the present invention and, together with the detailed description, serve to explain the principles and implementations of the invention. The figures are not to scale.

Figure 2A:
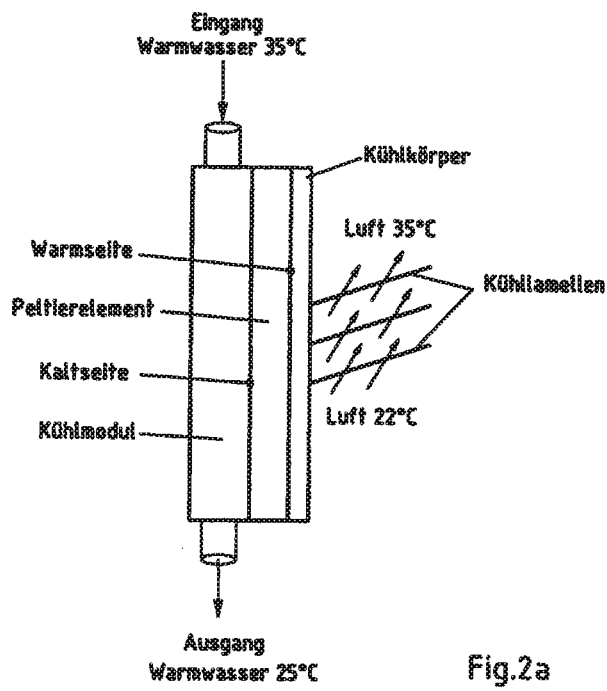
Figure 2B:
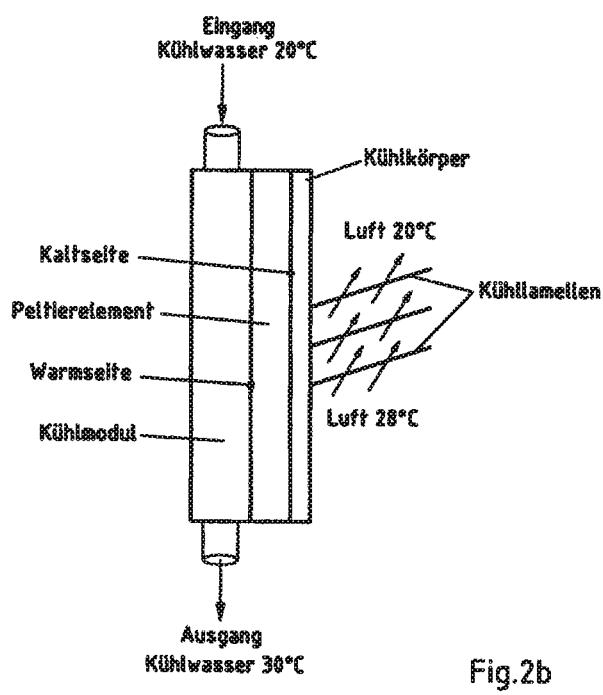
Figure 3:
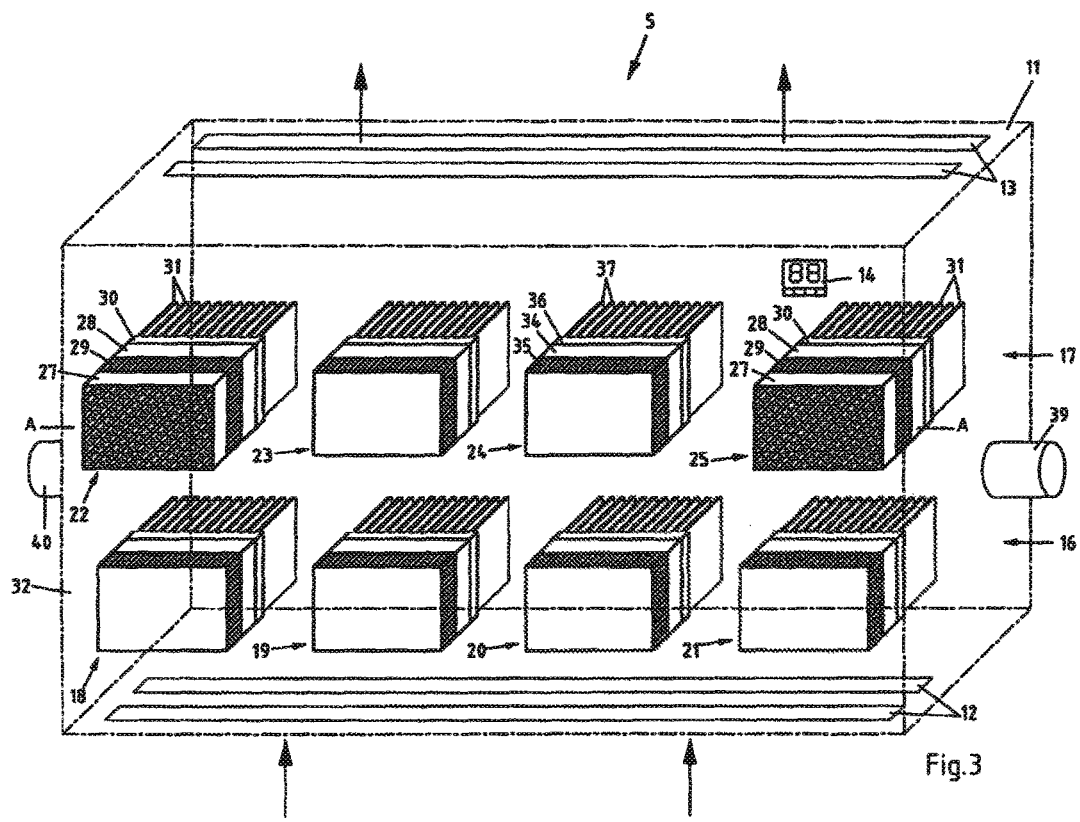

In the drawings:

FIG. 1 shows a schematic view of an arrangement for air-conditioning room air;

FIG. 2*a* shows a schematic view of an exemplary embodiment of a heat pump module operated in the heating mode;

FIG. 2*b* shows a schematic view of the heat pump module operated in the cooling mode;

FIG. 3 shows a schematic view of a heat pump unit, and

Figure 3A:
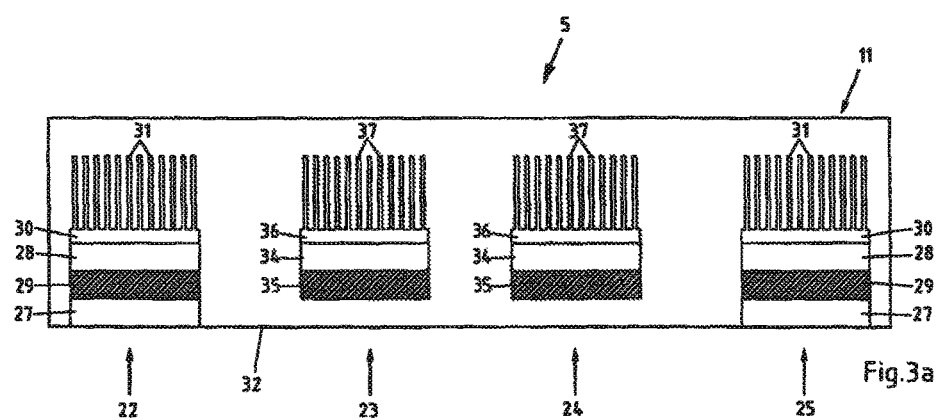

FIG. 3*a* shows a cross-section through the heat pump unit according to FIG. 3.

DETAILED DESCRIPTION OF THE INVENTION

FIG. 1 shows an exemplary schematic view of an arrangement according to the invention for air-conditioning room air. The arrangement comprises a central heating device 1 as well as multiple decentralized heat pump units 5-8 to be arranged inside the building 10 to be air-conditioned. In the present example, the heating device 1 is a heat pump, which can operate both in the heating mode and also in the cooling mode. The heat pump can have an outside unit 9 acting as a heat exchanger, for example. The heat exchanger can optionally also be arranged in the inside of the building 10 and can be connected via suitable means to a heat reservoir, for example, the outside air.

The term heating device is to be understood in the present case to include all types of heaters, such as oil heaters, gas heaters, wood heaters, pellet heaters, heat pumps, or electrical heaters. However, switchable devices, which can both cool and also heat, are also designated as heating devices in the present case, this list not being considered to be exhaustive.

Multiple separate heating circuits 2, 3, 4, each having a supply line 2a, 3a, 4a and a return line 2b, 3b, 4b, are connected to the heat pump. A heat-exchanging fluid, preferably water, circulates in the lines. The illustration of the circulating pumps and other elements required for this purpose, such as valves, is omitted here, since these components are known to those skilled in the art. A separate heating circuit is typically provided for each room to be heated. Alternatively, conventional line guides are also possible, as all used in typical central heating systems. In this regard, for example, individual, multiple, or joint riser lines having branches or arbitrary combinations thereof can be mentioned. A single heating circuit can also be provided in the specific case.

Each of the decentralized heat pump units 5-8 of the arrangement is incorporated into a heating circuit 2, 3, 4, more than one decentralized heat pump unit optionally also being able to be provided for such a heating circuit, as is indicated in the case of the two heat pump units 7, 8 incorporated in series into the one heating circuit 4.

The fundamental idea of this arrangement is that, using the central heating device 1, the heat-exchanging fluid is raised or lowered to a specific flow temperature, whereby the thermal energy of the fluid being used by the decentralized heat pump units 5-8 and, with additional use of electrical energy, being raised or lowered enough that the respective room is heated or cooled to a predetermined temperature. In heating operation, the heating device heats the heat-exchanging fluid to a temperature (flow temperature) of 30-40° C., for example, while in cooling operation the fluid is brought to a flow temperature of 15-25° C., for example. For this purpose, the central heating device has the listed outside unit 9, which does not have to be discussed in greater detail, however, since it is well known to those skilled in the art. However, only a relatively small temperature differential must still be generated using the respective decentralized heat pump unit 5-8, so that the respective room can be brought to the desired temperature.

Such an arrangement has the advantage that, on the one hand, the efficiency of the entire facility is very good, since both the central heating device 1 and also the decentralized heat pump units 5-8 can operate in an operating window in which they have a good efficiency. In addition, the decentralized heat pump units 5-8 allow the temperature and humidity to be set individually in the individual rooms. A further advantage of this arrangement is that large-area radiant bodies or a flat underfloor heater do not have to be provided, in order to bring the room to be heated to the desired temperature in spite of a comparatively low flow temperature, since the respective decentralized heat pump unit 5-8 only must raise the flow temperature locally by a comparatively small amount. Therefore, such an arrangement is also suitable in particular for the replacement of conventional radiator or conductor heaters.

Such an arrangement could therefore also be used in particular in building renovations or in general in the renovation of conventional heating systems, in particular if the respective building is not provided with a flat underfloor, wall, or ceiling heater. As an example, the replacement of an oil heating system is mentioned for this purpose, in which up to this point an oil burner having a flow temperature of 60-80° C., for example, was used and the heating energy was delivered to the individual rooms via radiators distributed in the house. In this case, the oil-fired boiler can be replaced by a central heating device, for example, a heat pump, while at least one radiator per room is replaced by a heat pump unit, of course, whereby also all radiators may be replaced by decentralized heat pump units. Therefore, based on the existing heat distribution infrastructure, a central low-temperature heater can be used, without large-area radiator bodies having to be installed in the rooms or having to be mounted in the form of underfloor or ceiling heating pipes. If thermoelectrically operating devices are used as the decentralized heat pump units, for example based on Peltier elements, this has the advantage over compressor devices that they substantially operate silently. If a central heating device is used which can both heat and also cool, for example a switchable heating pump, of course, if needed cooling can also be performed using such an arrangement. In order to ensure efficient operation, in particular also an efficient cooling operation, the decentralized heat pump units are preferably provided with a means for generating a forced air flow. In addition to the forced flow through the housing, the listed means in particular also cause forced convection of the air in the respective room.

Through the use of an arrangement implemented according to the invention, a conventional heater can therefore be replaced by a modern heat pump heater, the existing heat distribution infrastructure still being able to be used, which has the further advantage, inter alia, that the occupants do not have to move out during the conversion of the heating system, as would be the case if a flat underfloor, wall, or ceiling heater had to be installed.

FIG. 2a shows a schematic view of an exemplary embodiment of a heat pump module operated in the heating mode, as is preferably used in the listed decentralized heat pump units. The heat pump module consists of a thermoelectrically operating Peltier element, which has a planar connection to a cooling module. The cooling module has an inlet and an outlet for the heat-exchanging fluid (water). A cooling body, which is provided with a plurality of cooling fins, is arranged on the side of the Peltier element opposite to the cooling module. In the heating mode, the cold side of the Peltier element is oriented toward the cooling module, while the warm side faces toward the cooling body. If voltage is applied to the Peltier element, the cold side is cooled down while the warm side heats up further. On the one hand, this causes cooling of the fluid, for example, by 10° between the inlet and the outlet. On the other hand, the cooling body and therefore also its cooling fins are heated to a temperature above that of the fluid. If air is now forced past the cooling fins, the air heats up from 22° C. to 35° C., for example. The heated air can be used for heating. Because of the fact that the cold side of the Peltier element is heated to a moderate temperature of 30° C. by means of the hot water, for example, only a relatively small temperature differential $\Delta T$ is required between the cold side and the warm side of the Peltier element, in order to heat the air to a temperature required for heating the respective room, for example, 35° C.

FIG. 2b shows a schematic view of the heat pump module, which is operated in the cooling mode, of a decentralized heat pump unit. To be able to cool down the air flowing through, the Peltier element is reversed in polarity, so that its hot side faces toward the cooling module, while the cold side faces toward the cooling body.

With the application of the operating voltage, the cold side of the Peltier element is cooled down further, while the hot side heats up further. In the cooling mode, the hot side of the Peltier element is cooled by means of the fluid passing, while the temperature on the cold side sinks further due to the applied voltage. By delivering thermal energy to the fluid, it is heated by 10° C. between the inlet and outlet, for example. In order to cool down the air, it is in turn forced past the cooling fins, so that it cools down from 28° C. from 20° C., for example. Because the hot side of the Peltier element is continuously cooled by the fluid flowing past, again only a relatively small temperature differential ΔT is required between the cold side and the hot side of the Peltier element, in order to cool down the air to a temperature required for cooling the respective room, for example, 20° C.

FIG. 3 shows a schematic view of a preferred exemplary embodiment of a decentralized heat pump unit 5. The heat pump unit 5 has a housing 11, which is provided on the bottom and top sides with ventilation slots 12, 13, as indicated. The heat pump unit 5 additionally has means for generating a forced air flow, the air preferably flowing through the housing from bottom to top, in that the air is suctioned in via the ventilation slots 12 arranged in the bottom and blown out via the ventilation slots 13 arranged in the cover. For example, a fan or a blower can be mentioned as the means for generating a forced air flow, these means not being shown in greater detail. In addition, an operating panel 14 is arranged on the housing, by means of which the temperature or a desired function such as dehumidifying can be set. The operating panel 14 is preferably connected to a microprocessor, which activates the individual heat pump elements (Peltier elements) via power electronics according to the requirements. Of course, a central control unit can optionally also be provided, by means of which all heat pump units can be operated from a central location. The transmission from the central control unit to the local heat pump units can be performed by means of radio, for example. Additional further elements such as a temperature sensor, a humidity sensor, a receiver unit, etc. can be provided, but are not shown. Further elements such as air guiding ducts, fasteners for the Peltier modules, etc., are also not shown.

The actual heat pump modules are also arranged in the interior of the housing 11. In the present example, these consist of two rows 16, 17, arranged vertically one over the other, each having four Peltier modules 18-25. In the upper row 17, the two outer Peltier modules 22, 25 are implemented in sandwich construction, in that a cooling module 29 is arranged between each two Peltier elements 27, 28, in each case the front Peltier element 27 being in contact with a front plate 32 of the housing 11. The remaining six Peltier modules each comprise a Peltier element 34 having a cooling module 35 arranged thereon, the listed elements being listed as representative for all six Peltier elements on a Peltier element 24 of the upper row. All eight Peltier modules 18-25 additionally have a cooling body 30, 36, whose cooling fins 31, 37 are arranged in the interior of the housing 11 so that the forced air flow flows around them and they act as heat exchangers. The heat pump unit 5 is provided with an electrical terminal (not shown), via which the internal electrical consumers can be supplied with power. The Peltier modules, the fan, and further elements such as a microprocessor controller, including the associated power electronics for activating the Peltier elements, can also be mentioned in this regard. In order to be able to incorporate the heat pump unit 5 in the heating circuit to provide thermal energy, it is provided with an inlet 39 and an outlet 40 for the heat-exchanging fluid. In operation, the fluid flowing from the inlet to the outlet flows through the cooling modules 29, 35 of the Peltier modules. The individual cooling modules can be arranged in series, in parallel, or also in a combination thereof with respect to flow. The construction and the mode of operation of the Peltier modules was already explained above on the basis of FIGS. 2a and 2b.

When reference is made in the present context to a Peltier element, this can be understood to mean both a single Peltier element and also an arrangement of multiple Peltier elements to form an entire module, the latter also being designated in each case as a Peltier element for the sake of simplicity. For example, in a room having a volume of approximately 60 m$^3$, Peltier modules having an electrical connected load of approximately 900 W are used.

FIG. 3b shows a cross-section through the heat pump unit according to FIG. 3 along line A-A. It is recognizable in particular in this view that the two outer Peltier modules 22, 25 are implemented in sandwich construction, in that a cooling module 29 is arranged between each two Peltier elements 27, 28, while the two inner Peltier modules 23, 24 each comprise a Peltier element 34 and a cooling module 35 arranged flatly thereon. The cooling modules 29, 35 are shown shaded for better differentiation. Of the two outer Peltier modules 22, 25, the respective front Peltier element 27 is in contact with the front plate 32, which acts as the radiation plate, of the housing 11. This causes at least a part of the heat to be emitted in the form of radiation directly into the room in the heating mode. In order to ensure good heat transfer from the respective Peltier element 27 to the front plate 32 (housing cover), a thermal conduction paste can be used, for example.

In order to allow the most uniform possible usability of the decentralized heat pump unit, all Peltier modules can preferably be reversed in polarity individually via the controller, so that they can operate both in heating operation and also in cooling operation. The output of at least some Peltier modules is preferably also individually electrically settable, this preferably being performed fully automatically via the microprocessor controller.

The mode of operation of the decentralized heat pump unit will be explained in greater detail hereafter on the basis of several examples with reference to FIGS. 2 and 2a.

1. Heating

In simple heating operation, the Peltier modules 18-25 are activated in such a manner that the cold side of the respective Peltier element 27, 28, 34 is oriented toward the respective cooling module 29, 35. Since the fluid circulating in the respective cooling module 29, 35 is heated by the central heating device (heat pump) to flow temperature of 35° C., for example, the individual Peltier elements must only build up a relatively small temperature differential in the case of normal heating performance. By means of the fan, the air to be heated is suctioned in via the ventilation slots 12 arranged in the base and guided past the hot side of the respective Peltier element 28, 34 or cooling body 30, 36, where it heats up on the cooling fins 31, 37. The heated air then exits via the ventilation slots 13 arranged in the cover of the housing 11. In addition, heat is emitted directly into the room via the two outer Peltier modules 22, 25 of the upper row 17. Because a part of the thermal energy is emitted as radiation directly into the room, a particularly pleasant room climate can be provided in heating operation. Of course, the forced convection of the room air also contributes to a pleasant room climate and increases the efficiency.

2. Cooling

In cooling operation, the circulating fluid is brought or cooled down by means of the central heating device to a flow temperature of 20° C., for example. The Peltier modules 18-25 are activated in such a manner that the hot side of the respective Peltier element 27, 28, 34 is oriented toward the respective cooling module 29, 35. The Peltier elements 27, 28, 34 must again only build up a relatively small temperature differential, since their cold side is cooled down continuously to 22° C., for example, by the fluid. By means of the fan, the air to be cooled is suctioned in via the ventilation slots 12 arranged in the base and guided past the cold side of the cooling body 30, 36 of the respective Peltier element 28, 34, where it cools down on the cooling fins 31, 37. The cooled air again exits via the ventilation slots 13 arranged in the cover. Of course, no heat is radiated into the room in cooling operation via the two outer Peltier modules 21, 25 of the upper row 17.

The thermal energy to be dissipated from the room to be cooled is dissipated by means of the fluid from the respective room. In cooling operation, efficient cooling of the hot side of the Peltier elements is particularly important, since not only thermal energy must be dissipated from the room to be cooled, but rather also the electrical operating energy absorbed by the element itself, i.e., the sum of the heat pumped by the Peltier element plus the heat of the operating energy.

Depending on the climate conditions, the air is automatically dehumidified in cooling operation, since the relative water content or the relative humidity of the air rises upon cooling. If the air flowing past the cooling fins 31, 37 is cooled down below the dew point, condensed water forms. In order to collect this condensed water, the heating device is preferably provided with a collection basin and a drain, which drains the condensed water possibly arising upon cooling of the air. The condensed water can be introduced into the internal building wastewater line, for example.

3. Dehumidifying

In this operating mode, at least individual Peltier elements 27, 28, 34 are activated in such a manner that the cooling fins of the associated cooling body cool down to a temperature below the dew point of the air, so that condensed water forms. For this purpose, the heat pump unit is preferably provided with at least one dewpoint sensor and one temperature sensor, whose data are acquired and analyzed by the microprocessor controller for the purpose of activating the Peltier elements. In the dehumidifying operating mode, the air is at least minimally cooled, so that it has an at least slightly lower temperature at the outlet of the heat pump unit than at the inlet.

Attention must also particularly be given to this operating mode under economic aspects, since it can be more cost-effective not to cool down the room air but rather to dehumidify it. In any case, at specific climate conditions, dehumidification, for example, by 20% relative humidity, can subjectively result in the same result or cause the same perceived effect as cooling down the room air by several degrees Celsius.

4. Heating and Dehumidifying

This function represents a novelty for a heat pump unit of the type under discussion here. For this operating mode, it is necessary for the Peltier elements of at least some Peltier modules to be able to be individually electrically activated and reversed in polarity. Specifically, at least some Peltier elements of the Peltier modules 18-21 of the lower row 16 are activated in such a manner that the cooling fins of the respective associated cooling body cool down to a temperature below the dew point of the incoming air, so that condensed water again forms. At least some of the further Peltier elements are operated in the "heating mode", in contrast, so that the air flowing past them heats up. The Peltier elements of the Peltier modules 22-25 of the upper row 17 are preferably operated in the heating mode, so that the air flowing through is first dehumidified and then heated.

This fourth operating mode is particularly suitable for rooms which must be heated, on the one hand, and in which a large amount of moisture is delivered to the air, on the other hand. Fitness centers are listed as an example thereof, which are known to suffer from a high or excessively high ambient humidity even in winter. Another widespread example are rooms for drying laundry.

In summary, it can be stated that the system according to the invention, in particular in combination with heat pump units implemented according to the invention, allows universal operating possibilities. In addition, the system is distinguished by a good overall efficiency (coefficient of performance (COP)) and allows the temperature and optionally the ambient humidity to be individually settable in the individual rooms in a simple manner. A very decisive advantage is that a central heating device can be used, which operates at comparatively low flow temperatures, the flow temperature being able to be raised to a higher level in the decentralized arranged heat pump units, so that a pleasant room climate may be achieved, without a large heat exchanger surface having to be provided for this purpose, for example, in the form of large-area radiator bodies or a flat underfloor, wall, or ceiling heater.

A particularly pleasant room climate can be provided in the heating mode by forced convection of the room air and the additional emission of thermal radiation.

Instead of the heat pump described as the central heating device, other forms of heating devices such as oil heaters, gas heaters, wood heaters, etc. can also be used. If the respective system is also to be able to operate in the cooling mode, the listed heating devices can optionally be provided with an outside heat exchanger. In addition, the connection of external energy sources is also possible.

Moreover, instead of electrically operated heat pump units, other variants of decentralized heat pump units also fundamentally come into consideration, for example, those which are operated using fossil fuels or biogas, in particular the heat generated by combustion of the listed materials being used. It is obvious that in such a case thermoelectrically operating Peltier elements are not used as the heat pump elements, but rather a compressor device, inter alia, for example.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims and their equivalents.

The invention claimed is:

1. A heat pump unit, comprising
a housing, the housing including walls and a front plate and having
first openings and second openings,
heat pump modules each including one or more thermoelectrically operating Peltier elements and one or more cooling modules connected to the one or more Peltier elements, the cooling module having an inlet and an outlet for a heat exchanging fluid, and
a fan, wherein
the heat pump modules and the fan are arranged in an interior of the housing,
the fan is configured to pull air through the first openings, convey the air to the heat pump modules and blow the air through the second openings,
by supplying electrical energy to the heat pump modules, the heat pump modules in a heating mode withdraw heat energy from the fluid and deliver the withdrawn heat energy to the air passing by, and in a cooling mode withdraw heat energy from the air passing by and deliver the withdrawn heat energy to the fluid,
the front plate is a boundary of the housing having an outer face configured to be in contact with the air in a room and an inner face configured to be in direct contact with at least one of the one or more Peltier elements
in order to emit in the heating mode heat energy withdrawn from the fluid by the at least one of the one or more Peltier elements via the front plate as thermal radiation directly into the room.

2. The heat pump unit of claim 1, wherein the heat pump unit is configured to operate in different operation modes, one of the different operation modes including an operation mode for dehumidifying and heating the air conveyed to the heat pump modules in which at least some of the heat pump modules are configured to operate in the heating mode and at least some further heat pump modules are configured to operate simultaneously in the cooling mode in order to condense water out of the air which passes the heat pump modules operated in the cooling mode.

3. The heat pump unit of claim 1, wherein some Peltier elements of the heat pump modules are in thermal contact with a cooling body provided with cooling fins at which the air pulled through the first openings passes, the Peltier elements of the heat pump modules are arranged at least in a bottom row and an upper row, some of the Peltier elements of the heat pump modules of the bottom row are controllable in such a manner, that the cooling fins of the associated cooling body cool down to a temperature below the dew point of the air pulled through the first openings, and simultaneously some of the Peltier elements of the heat pump modules of the upper row are controllable in such a manner that the air passing the cooling fins of the associated cooling body is heated.

4. The heat pump unit of claim 1, wherein at least some of the Peltier elements are implemented in sandwich construction in that in each case a cooling module is arranged between two Peltier elements, the fluid circulating in the circuit flowable through the cooling module, wherein in each case one of the two Peltier elements is in contact with the front plate of the housing.

5. The heat pump unit of claim 2, wherein at least some of the Peltier elements are implemented in sandwich construction in that in each case a cooling module is arranged between two Peltier elements, the fluid circulating in the circuit flowable through the cooling module, wherein in each case one of the two Peltier elements is in contact with the front plate of the housing.

6. The heat pump unit of claim 3, wherein at least some of the Peltier elements are implemented in sandwich construction in that in each case a cooling module is arranged between two Peltier elements, the fluid circulating in the circuit flowable through the cooling module, wherein in each case one of the two Peltier elements is in contact with the front plate of the housing.

7. An arrangement for air-conditioning rooms, having at least one central heating device, to which lines accommodating a heat exchanging fluid are connected, the arrangement comprising at least one decentralized heat pump unit according to claim 1, which heat pump unit is connected to the central heating device by said lines.

8. An arrangement for air-conditioning rooms, having at least one central heating device, to which lines accommodating a heat exchanging fluid are connected, the arrangement comprising at least one decentralized heat pump unit according to claim 2, which heat pump unit is connected to the central heating device by said lines.

9. A method for heating room air, the method comprising
heating a liquid medium by means of a central heating device and circulating the liquid medium in a circuit having one or more decentralized heat pump units, the respective decentralized heat pump unit having heat pump modules each including one or more thermoelectrically operating Peltier element connected to one or more cooling module through which the liquid medium flows,
using the thermoelectrically operating Peltier elements to withdraw heat from the liquid medium and generate heat having a temperature that is higher than a temperature of the liquid medium,
sucking in air, conveying the air to the heat pump modules and blowing out the air, wherein at least a part of the heat withdrawn from the liquid medium by the heat pump modules is discharged to the air passing by, and
by means of a front plate which is a boundary of a housing of the heat pump unit, the front plate having an outer face configured to be in contact with the air in a room and an inner face configured to be in direct contact with at least one of the one or more Peltier elements emitting the heat withdrawn from the liquid medium by this at least one Peltier element in the form of radiation directly into the room.

10. The method of claim 9, further comprising
cooling the air sucked in to below the dew point in order to dehumidify the air,
heating the cooled air, and
only then delivering the heated air to the room.

* * * * *